(12) United States Patent
Shew et al.

(10) Patent No.: US 8,235,253 B2
(45) Date of Patent: Aug. 7, 2012

(54) EASY SHIFT DUAL-MODE PISTOL-GRIP GREASE GUN

(75) Inventors: Jerry D. Shew, Charlotte, NC (US); Don K. Shinn, Jr., Jonesborough, TN (US); Christopher W. Joseph, Pineville, NC (US)

(73) Assignee: Alemite LLC, Fort Smith, SC (US)

( * ) Notice: Subject to any disclaimer, the term of this patent is extended or adjusted under 35 U.S.C. 154(b) by 817 days.

(21) Appl. No.: 12/334,233

(22) Filed: Dec. 12, 2008

(65) Prior Publication Data

US 2010/0147893 A1 Jun. 17, 2010

(51) Int. Cl.
*G01F 11/00* (2006.01)

(52) U.S. Cl. ............ 222/256; 222/1; 222/287; 222/309; 222/324; 29/888.02; 184/105.2; 74/104

(58) Field of Classification Search .................. 222/256, 222/287, 309, 324, 340, 380, 383, 325–327, 222/391, 1; 184/105.1, 105.2; 29/888.02; 74/104

See application file for complete search history.

(56) References Cited

U.S. PATENT DOCUMENTS

| | | | |
|---|---|---|---|
| 818,783 A * | 4/1906 | Philippi | 30/363 |
| 1,377,023 A | 5/1921 | Nelson | |
| 1,619,126 A | 3/1927 | Hundemer | |
| 1,947,088 A | 2/1934 | Johnson et al. | |
| 2,497,762 A | 2/1950 | Davis | |
| 3,187,959 A | 6/1965 | Morehouse | |
| 3,780,830 A | 12/1973 | Helgerud et al. | |
| 4,083,428 A | 4/1978 | Ness | |
| 4,664,298 A * | 5/1987 | Shew | 222/287 |
| D295,599 S * | 5/1988 | Shew | D8/14.1 |
| 5,277,339 A | 1/1994 | Shew et al. | |
| 7,337,927 B2 | 3/2008 | Linkletter et al. | |
| 7,377,406 B2 | 5/2008 | Linkletter et al. | |

* cited by examiner

*Primary Examiner* — J. Casimer Jacyna
(74) *Attorney, Agent, or Firm* — Senniger Powers LLP

(57) ABSTRACT

A dual mode pistol grip grease gun that operates in either the volume mode or the pressure mode. The grease gun includes a cylinder head having a handle attached thereto. Attached to the cylinder head via a shiftable link is a lever, which has a slot at one end. The shiftable link is disposed in the slot of the lever, and its position therein defines whether the grease gun is in the volume or the pressure mode. The shape of the slot is such that, when the grease gun is in volume mode and when the lever is fully pressed toward the handle, an angle defined by a first axis (defined as a line connecting a pivot point of a connection of the link to the cylinder head and a pivot point of a connection of the link to an end of the slot defining volume mode) and a second axis (defined as a line connecting the pivot point of the connection of the link to the end of the slot defining volume mode and a point along a bottom curve of the slot where the concavity of the curve changes) is approximately ten degrees. The shape of the slot, roller and tabs on the link allow for ease of shifting.

17 Claims, 6 Drawing Sheets

EASY SHIFT DUAL-MODE PISTOL-GRIP GREASE GUN

BACKGROUND

The present invention relates generally to fluid lubricant dispensing equipment, and more particularly to a pistol-grip grease gun that can be operated in either pressure mode or volume mode.

A pistol-grip grease gun has a rigid handle and a pivoting lever that are sized and positioned so the gun can be operated with only one hand. A dual-mode grease gun has an adjustment to select between a volume mode and a pressure mode. The volume mode of operation allows a user to apply as much lubricant per stroke into a grease-fitting as possible. The pressure mode of operation allows lubricant to be provided at a greater pressure, such as when a grease-fitting is frozen, impeding the flow of lubricant, or when a bearing being lubricated has a close tolerance such that getting lubricant into it requires more pressure. It is desirable to have a pistol-grip grease gun that can operate in both the volume mode and the pressure mode.

One such dual-mode pistol-grip grease gun is disclosed in U.S. Pat. No. 5,277,339 ("the '339 patent") assigned to Alemite LLC. The grease gun disclosed in that patent includes a shiftable link which allows a user to switch between operation in volume and pressure modes. However, the link in the '339 patent may be difficult to shift between the two modes of operation because the lever must be pressed down (in a direction axial to the piston) in order to release the link from the end portion of the U-shaped slot, before it may be shifted from volume mode to pressure mode.

Accordingly, a dual-mode pistol-grip grease gun which is able to be easily shifted between volume and pressure modes is desired.

SUMMARY

One embodiment of the invention provides a dual-mode pistol-grip grease gun that includes a cylinder head portion having a recess formed therein, the recess being adapted to receive a cylinder, a handle having a first end attached to the cylinder head portion, and having a free second end, and a link having a first end and a second end, the first end of the link being rotatably connected to the cylinder head. The grease gun further includes a lever having a first end having a slot formed therein and a free second end, the second end of the link is slidably and rotatably mounted in the slot, wherein the slot has a first end portion and a second end portion each of which receive the second end of the link, wherein the second end of the link is movable between the first end portion of the slot and the second end portion of the slot, wherein positioning the second end of the link in the first end portion of the slot adapts the gun to operate in a volume mode and wherein positioning the second end of the link in the second end portion of the slot adapts the gun to operate in a pressure mode. The grease gun further includes a piston rotatably fastened to a central portion of the lever, the piston being in alignment with a piston cavity extending through the cylinder head portion, a spring surrounding the piston that biases the lever away from said handle, and a stop disposed in the lever central portion and engageable with a side of the piston to define a maximum withdrawal position of the piston from the piston cavity.

According to an embodiment of the invention, the slot is shaped such that, when the second end of the link is positioned in the first end portion of the slot, the link is manually adjustable, by pushing the link toward the second end portion of the slot, in a single action.

In another aspect, the shape of the slot is determined based on an angle defined by a first axis and a second axis when the link is positioned in the first end portion of the slot and the lever is fully pressed toward the handle. The first axis is defined as a line connecting a pivot point of a connection of the first end of the link to the cylinder head and a pivot point of a connection of the second end of the link to the first end portion of the slot. The second axis is defined as a line connecting the pivot point of the connection of the second end of the link to the first end portion of the slot and a point along a bottom curve of the slot where the curve changes from concave to convex.

In yet another aspect, the first end portion of the slot is circular thereby forming the concave portion of the curve, and the angle defined by the first axis and the second axis is between more than zero degrees and less than thirty-two degrees with the lever in the down, or fully-squeezed, position and the link is positioned in the first end portion of the slot.

In another aspect, such angle defined by the first axis and the second axis is between approximately five degrees and approximately twenty degrees with the lever in the down position and the link is positioned in the first end portion of the slot.

In yet another aspect, such angle defined by the first axis and the second axis is approximately ten degrees with the lever in the down position and the link is positioned in the first end portion of the slot.

In other aspect, the slot is shaped such that the bottom curve of the slot is a gradual curve.

In yet another aspect, the link further includes tabs located near the second end of the link.

In another aspect, the first end of the link is rotatably connected to the cylinder head by a rivet.

In yet another aspect, the piston is rotatably fastened to the central portion of the lever by a rivet.

In another aspect, the second end of the link is slidably and rotatably mounted in the slot by a roller.

In another aspect, the slot is shaped such that, when the second end of the link is positioned in the first end portion of the slot, the link is manually adjustable, by pressing down on the lever and pushing the link toward the second end portion of the slot, in the single action.

In yet another aspect, the slot is further shaped such that, when the second end of the link is positioned in the second end portion of the slot, the link is manually adjustable.

Another embodiment of the invention provides a method of manufacturing a dual-mode grease gun. The method includes forming a cylinder head portion having a recess formed therein, the recess being adapted to receive a cylinder, forming a handle having a first end attached to the cylinder head portion, and having a free second end, and forming a link having a first end and a second end and rotatably connecting a first end of the link to the cylinder head. The method further includes forming a lever including a slot in a first end and slidably and rotatably mounting the second end of the link in the slot, wherein the slot has a first end portion and a second end portion adapted to receive the second end of the link, wherein the second end of the link is movable between the first end portion of the slot and the second end portion of the slot, wherein positioning the second end of the link in the slot first portion adapts the gun to operate in a volume mode and wherein positioning the second end of the link in the slot second portion adapts the gun to operate in a pressure mode. The method further includes forming a piston rotatably fastened to a central portion of the lever, the piston being in alignment with a piston cavity extending through the cylinder head portion, forming a spring surrounding the piston that biases the lever away from said handle, and forming a stop disposed in the lever central portion and engageable with a side of the piston to define a maximum withdrawal position of the piston from the piston cavity.

According to this embodiment, forming the slot includes determining a shape of the slot such that when the second end of the link is positioned in the first end portion of the slot, the link is manually adjustable, by pushing the link toward the second end portion of the slot, in a single action.

In another aspect, determining the shape of the slot includes determining the value of an angle defined by a first axis and a second axis when the link is positioned in the first end portion of the slot and the lever is fully pressed toward the handle. The first axis is defined as a line connecting a pivot point of a connection of the first end of the link to the cylinder head and a pivot point of a connection of the second end of the link to the first end portion of the slot. The second axis is defined as a line connecting the pivot point of the connection of the second end of the link to the first end portion of the slot and a point along a bottom curve of the slot where the concavity of the curve changes from concave to convex.

In another aspect, the first end portion of the slot is circular thereby forming the concave portion of the curve, and the angle defined by the first axis and the second axis is between more than zero degrees and less than thirty-two degrees with the lever in the down position and the link is positioned in the first end portion of the slot.

In another aspect, the angle defined by the first axis and the second axis is between approximately five degrees and approximately twenty degrees with the lever in the down position and the link is positioned in the first end portion of the slot.

In yet another aspect, the angle defined by the first axis and the second axis is approximately ten degrees with the lever in the down position and the link is positioned in the first end portion of the slot.

In another aspect, the slot is shaped such that the bottom curve of the slot is a gradual curve.

In another aspect, forming the slot further includes determining the shape of the slot such that when the second end of the link is positioned in the first end portion of the slot, the link is manually adjustable, by pressing down on the lever and pushing the link toward the second end portion of the slot, in the single action.

In yet another aspect, forming the link further includes forming tabs located near the second end of the link.

Another embodiment of the invention provides a method of using a dual-mode grease gun which includes a shiftable link rotatably connected to a cylinder head of the grease gun and rotatably connected to a lever of the grease gun, the link being connected to the lever via a roller arranged in a slot arranged in the lever and the link being movable between a first end portion of the slot and a second end portion of the slot, wherein positioning the link in the first end portion of the slot adapts the gun to operate in a volume mode and positioning the second end of the link in the second end portion of the slot adapts the gun to operate in a pressure mode. The method includes shifting the grease gun from operating in the volume mode to operating in the pressure mode, wherein the shifting is achieved manually by pushing on the link near the second end portion of the link in a single action.

In another aspect, pushing on the link comprises pushing on tabs provided on an end of the link nearer the connection to the lever.

In another aspect, shifting the grease gun from operating in the volume mode to operating in the pressure mode, further comprises pressing down on the lever and pushing the link in the single action.

In yet another aspect, the slot is shaped such that, when the link is positioned in the first end portion of the slot and when the lever is fully pressed toward the handle, an angle defined by a first axis and a second axis is approximately ten degrees. The first axis is defined as a line connecting a pivot point of a connection of the link to the cylinder head and a pivot point of a connection of the link to the first end portion of the slot. The second axis is defined as a line connecting the pivot point of the connection of the link to the first end portion of the slot and a point along a bottom curve of the slot where the concavity of the curve changes from concave to convex.

BRIEF DESCRIPTION OF THE DRAWINGS

The foregoing and other aspects of the invention will be better understood from the following detailed description of a preferred embodiment of the invention, which is provided in connection with the accompanying drawings, in which.

DETAILED DESCRIPTION OF A PREFERRED EMBODIMENT

In the following detailed description, reference is made to the accompanying drawings which form a part hereof, and in which is shown by way of illustration specific embodiments of the invention. These embodiments are described in sufficient detail to enable those skilled in the art to make and use them, and it is to be understood that changes may be made without straying from the spirit and scope of the invention.

Figure 1:
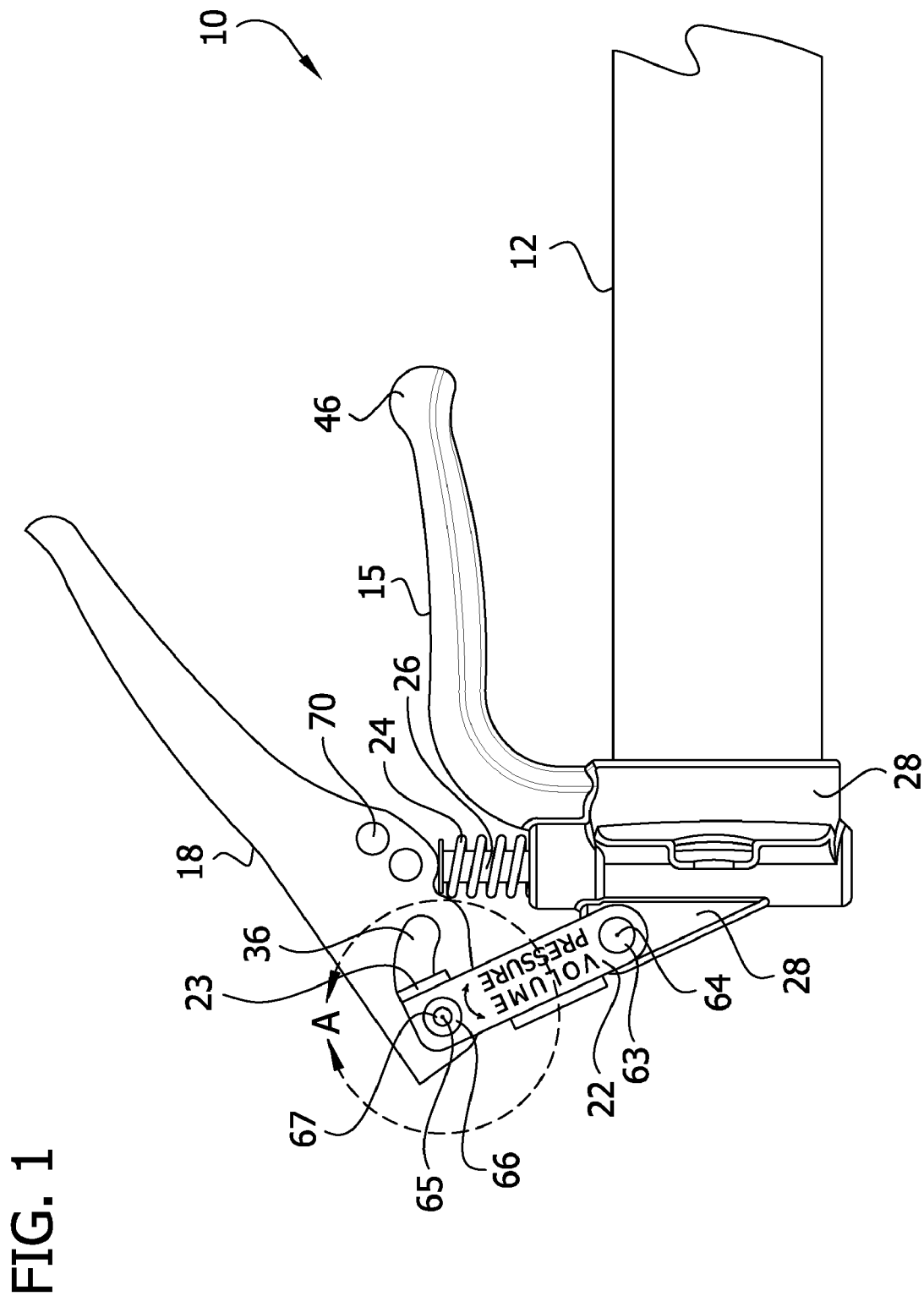
FIG. 1 is a side view of a dual-mode pistol-grip grease gun according to an embodiment of the invention.
Figure 2:
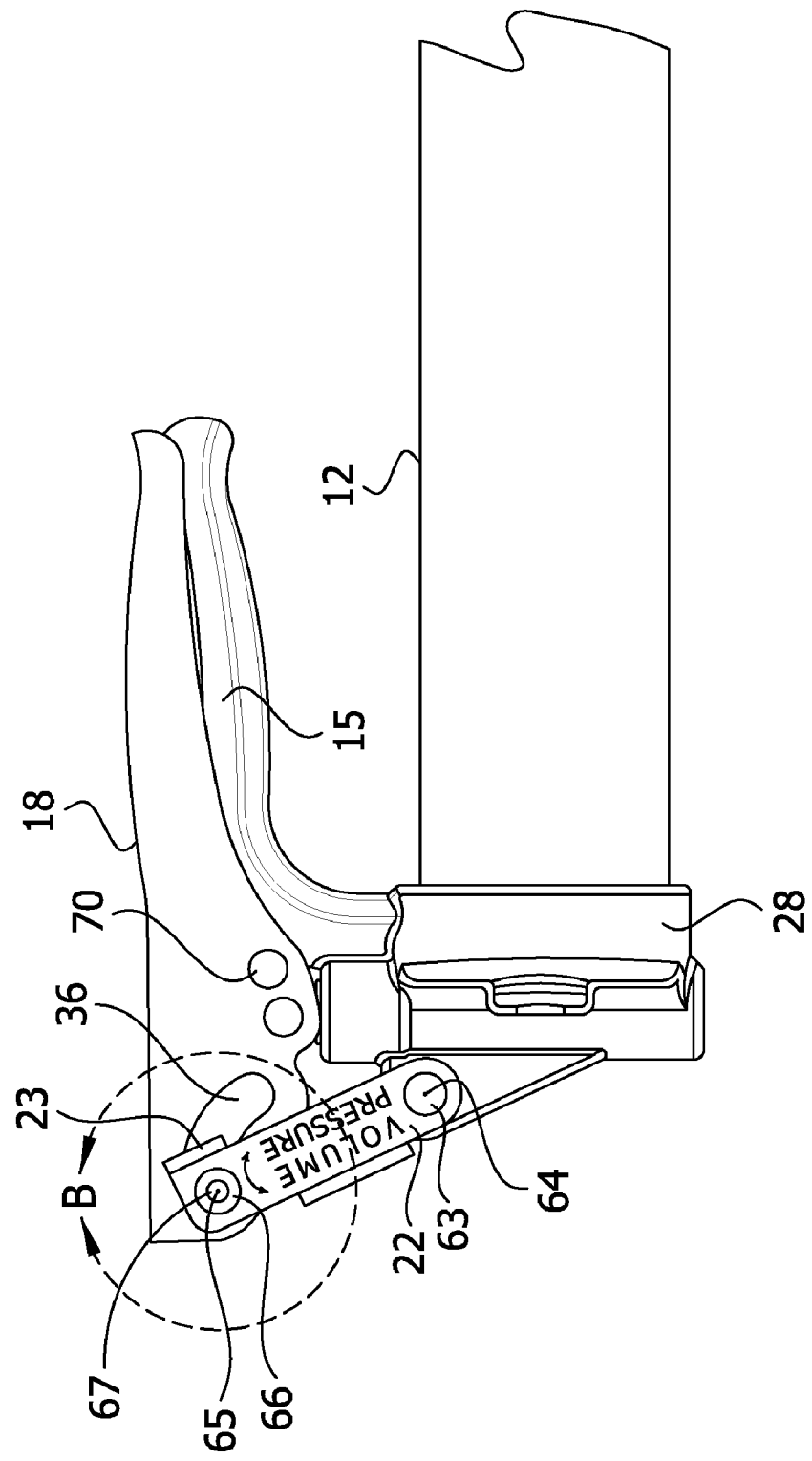
FIG. 2 is a view like FIG. 1.
Figure 3:
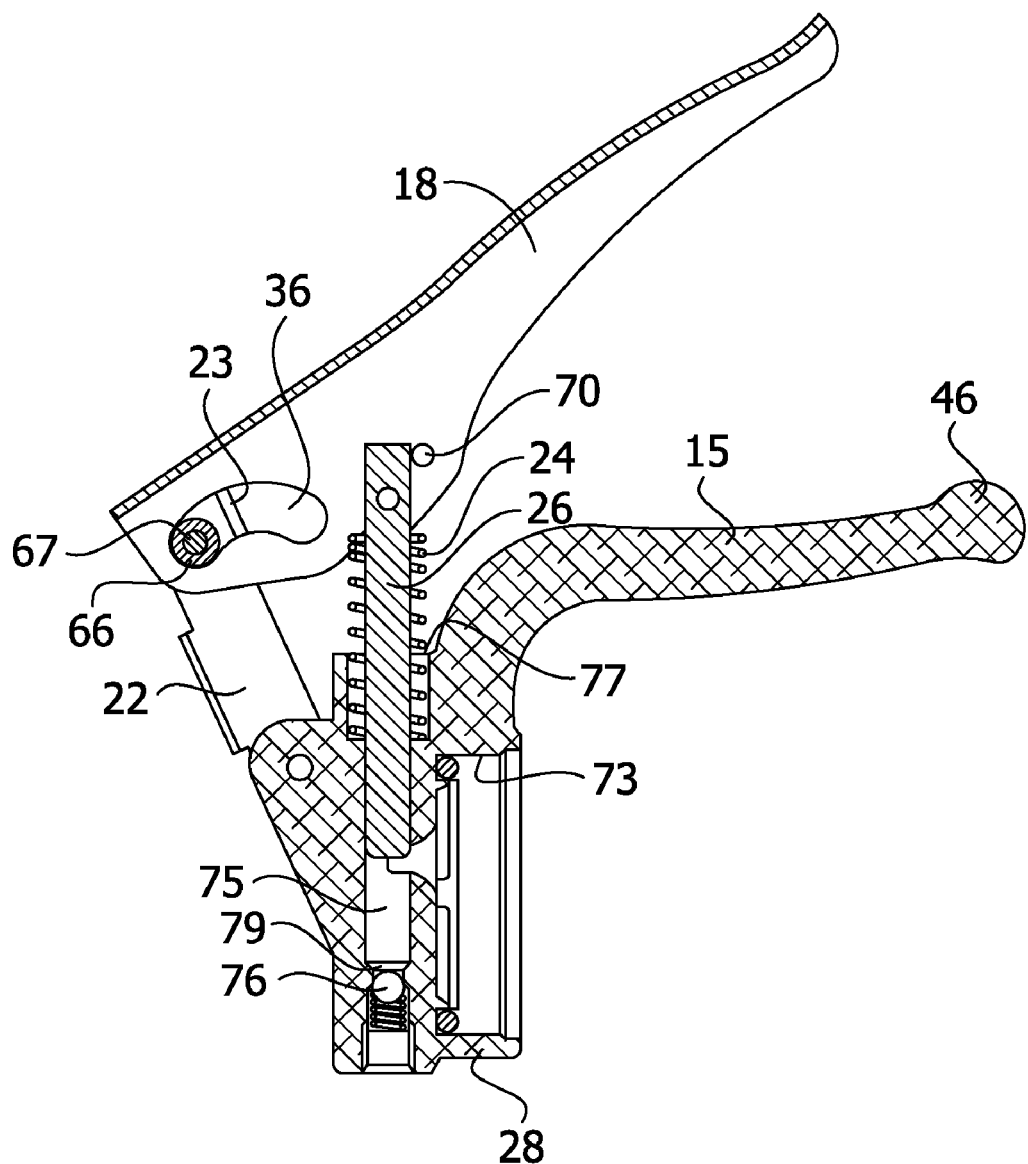
FIG. 3 is a cross-sectional view of the dual-mode pistol-grip grease gun of FIG. 1.

Referring to the drawings, and in particular, FIGS. 1-3, a dual-mode pistol-grip grease gun 10 is illustrated. The grease gun 10 includes a cylinder 12. The cylinder 12 contains the lubricant when the grease gun 10 is charged and is attachable to a lubricant dispensing cylinder head 28. The cylinder head 28 can be any grease gun cylinder head of conventional design. A handle 15 is connected to the cylinder head 28. In FIGS. 1-3, the handle 15 is integrally formed with the cylinder head 28, but this configuration is not required and the handle 15 may be immovably connected to the cylinder head 28 by other known methods, such as using rivets. A shiftable link 22 is also connected to one end of the cylinder head 28. The other end of the shiftable link 22 is connected to a lever 18 via a slot 36 located on the lever 18. The particular shape of the slot 36 will be discussed in more detail below, with reference to FIG. 5. Also connected to the lever 18 is a piston 26. The piston 26 is disposed within and moves in and out of the cylinder head 28. Surrounding the piston 26 is a spring 24 which biases the lever 18, thereby forcing the piston away from the cylinder head 28. A stop 70 is located on the lever 18 and serves as a stopping point for the lever 18 when the grease gun 10 is in the relaxed position, so that the span between the lever 18 and the handle 15 remains the same for both the volume mode and the pressure mode.

As can be seen in FIGS. 1-3, the handle 15 is generally L-shaped. The handle 15 also includes a protrusion 46 that extends in an essentially perpendicular fashion away from the handle 15. The protrusion 46 acts as a stopping point for the lever 18 when it is coming down towards the handle 15, nearing the fully-squeezed position. This protrusion 46 prevents the handle 15 from pinching the skin on the user's hand. It also prevents the piston 26 from contacting the bottom 79 of the piston cavity 75 which could cause premature wear. As can also be seen in FIGS. 1 and 3, the lever 18 is generally straight.

Referring to FIG. 3, the cylinder head 28 has a recess 73 which may be threaded to allow the cylinder 12 to be easily attached to the cylinder head 28. A piston cavity 75 is formed in the cylinder head 28, which opens at the top 77 of the cylinder head 28 so that the piston 26 can enter it. When pressure is applied to the lever 18, the piston 26 enters the piston cavity 75, thereby forcing lubricant to leave the cylinder head 28. The ball valve 76 prevents lubricant from flowing back into the piston cavity 75. The operation of the cylinder head 28 need not be discussed here, as all the various fluid lubricant dispenser head techniques known in the art work well in the present invention.

As noted above, the cylinder 12 of the grease gun 10 is attachable to a lubricant dispensing cylinder 28. The first end 53 of the link 22 is rotatably connected to the cylinder head 28 by rivet 63 through the head-link connection slot 55 of the link 22. Rivet 63 allows the shiftable link 22 to rotatably pivot around pivot point 64. The second end 57 of the link 22 is rotatably connected to the lever 18 at the link-lever connection slot 59 of the link 22 and the slot 36 of the lever 18 by a roller 66. The roller 66 is a hollow cylinder through which rivet 67 extends. The roller 66 allows the lever 18 to rotatably pivot about the shiftable link 22 around pivot point 65. The roller 66 also facilitates easier shifting between the two operating modes (volume and pressure) of the grease gun 10.

Figure 5:
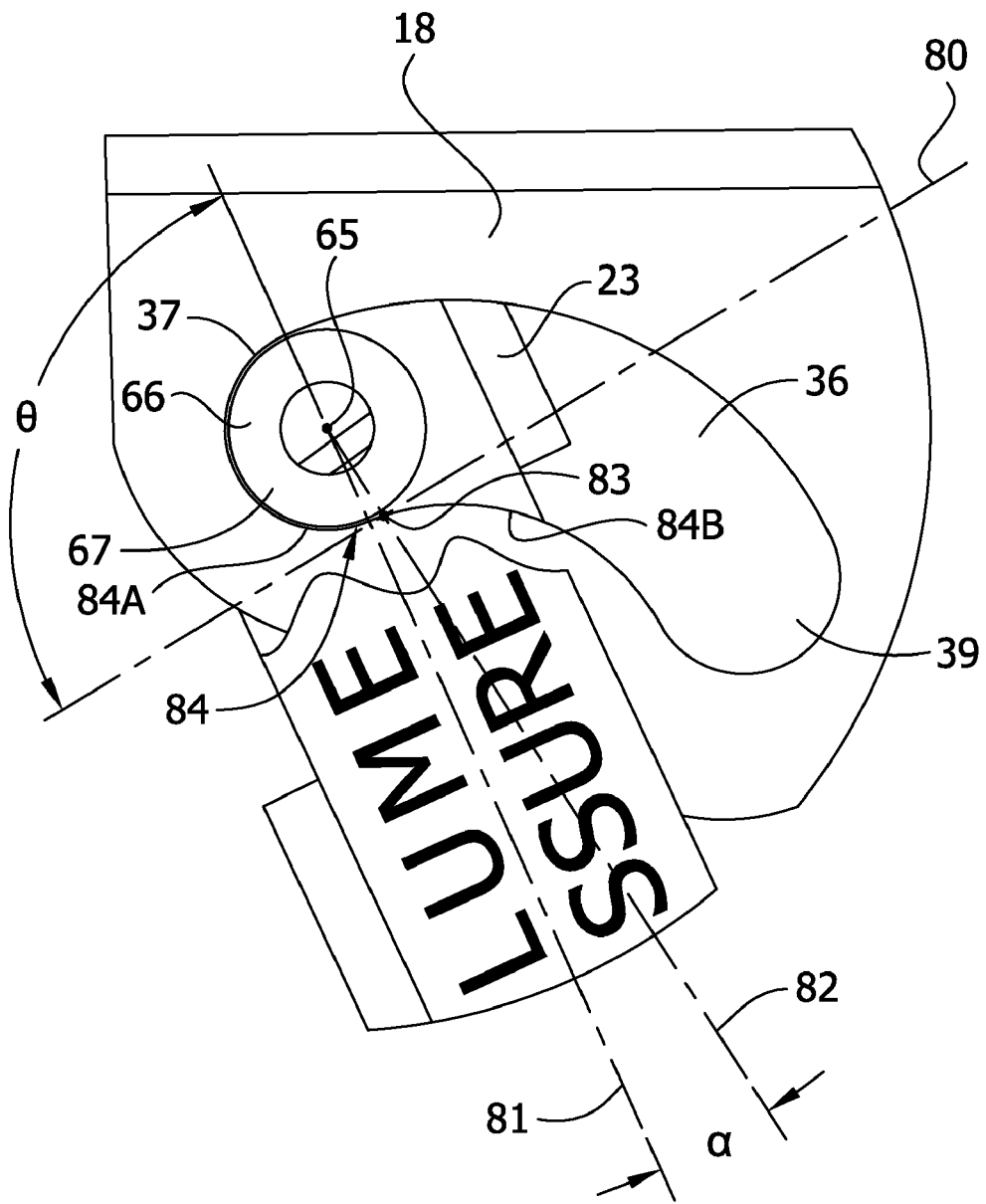
FIG. 5 is a close-up view of the portion B of the dual-mode pistol-grip grease gun of FIG. 2, wherein the dual-mode pistol-grip grease gun is switched to volume mode.

Referring now to FIG. 5, the shape of the slot 36 is now described. The shape of slot 36 allows the shiftable link 22 to be easily moved between two separate and distinct locations, a first end portion 37 and a second end portion 39. The shape of slot 36 is also such that the first end portion 37 and the second end portion 39 provide adequate support for the lever 18 when it is being depressed. The optimum shape of the slot 36 is determined based on a balance of the considerations of ease of shifting and the prevention of accidental shifting during use. It has been found that an acceptable balancing of these factors can be accomplished in accordance with the following.

As can be seen in the embodiment of FIG. 5, curve 84 at the bottom of the slot (going through a point 83) is a gradual curve, with no sudden variations in curvature. The curve 84 includes a concave arc 84A and a convex arc 84B. The point 83 defines the point at which the curve 84 changes from the concave arc 84A to the convex arc 84B. The line 80 illustrates a tangent to the curve 84 at this point 83. An axis 81 is defined as a line which connects the pivot point 65 and the pivot point 64 (FIG. 1) when the lever 18 is in the fully-squeezed position as shown in FIG. 5. An axis 82 is defined as a line which connects the pivot point 65 and the point 83 when the lever 18 is in the fully-squeezed position as shown in FIG. 5. The angle α is defined as the angle between the axis 81 and the axis 82. The angle Ø is defined as the angle between the line 80 and the axis 81.

The value of the angle α is important in determining the shape of slot 36. If the angle α is zero, then the roller 66 will not likely maintain its proper position when the link 22 is in the volume position and the lever 18 is depressed during operation (as shown in FIG. 5), but will instead be more likely to inadvertently shift out of the first end portion 37 of the slot 36 during use. Therefore, the angle α preferably should be some value greater than zero. However, the larger the value of the angle α, the harder it becomes to move the link out of the first end portion 37 of the slot 36. When the angle α is thirty-two degrees, shifting of the link 22 requires that the lever 18 be pressed down significantly before the link 22 is able to be shifted.

In one exemplary embodiment, the angle α is equal to ten degrees. This results in the value of the angle Ø being equal to one hundred degrees. This configuration ensures that the angle α is large enough (when taking into account manufacturing intolerances) that the roller 66 will remain in place during operation of the gun 10 and is small enough to allow for ease of shifting of the link 22 from the first end portion 37 to the second end portion 39. However, it should be noted that the angle α may vary between any angle larger than zero degrees and any angle smaller than thirty-two degrees. More preferably, the angle α is between approximately five degrees and approximately twenty degrees. Most preferably, the angle α is approximately ten degrees. By maintaining the angle α at these values, the link 22 may be easily shifted and it will not inadvertently shift during operation.

Shifting would normally occur when the lever 18 is not depressed. In the illustrated embodiment, the link 22 can be easily shifted from the volume mode to the pressure mode by pressing down slightly on the lever 18 (in a direction axial to the piston 26) and then pushing on one of the tabs 23 of the link 22. The link 22 may also be shifted from the volume mode to the pressure mode by pushing on the tabs 23 of the link 22. Moreover, in the illustrated embodiment, with the lever 18 in the down position, the link 22 may be easily shifted from the volume mode to the pressure mode by pushing only on the link 22, which may be accomplished using only the user's gripping hand with which he is operating the grease gun 10. With the angle α at the above-mentioned values, when the lever 18 is depressed, the link should not inadvertently shift from volume to pressure mode. The link 22 can be easily shifted from the pressure mode to the volume mode without pressing on the lever when the lever 18 is in the fully open position. As stated above, the link 22 may be shifted from the pressure mode to the volume mode when the lever 18 is in the fully open position, without pressing down on the lever 18. However, if the lever 18 is pressed down slightly, less than is required for the shifting operation of the grease gun disclosed in the '339 patent, the shifting may be even easier. Further, in the illustrated embodiment, because of the shape of the slot, the link may move in the slot toward the pressure mode position at the same time as the lever is being pressed down. The shifting from the volume mode to the pressure mode is easier in the disclosed embodiments, as compared to prior grease guns, because the user can merely push on the link, or press down on the lever 18 and push the tabs 23 of link 22, either in a single action. While in operation a slight downward motion on the lever 18 may be desired as or before the link 22 is initially moved, effectively the shifting is still accomplished by a single action by the user.

Further, in the embodiment of FIG. 5, the first end portion 37 of the slot 36 is circular (which forms the concave arc 84A of the curve 84) until the point 83 at which the curve changes to the convex arc 84B. It should be noted that the concave arc 84A of the curve 84 may also be opening up (i.e., increasing radius) and still be concave, before the switch to the convex arc 84B at the point 83. The concave arc 84A of the curve 84 may also be closing (i.e., decreasing radius) and still be concave, before the switch to the convex arc 84B at the point 83. The particular geometry of the curve 84 may vary, as long as the requirements that the link 22 can be easily shifted and cannot inadvertently shift during operation are maintained.

The particular shape of the slot 36 of the disclosed embodiments allows the link 22 to be more easily shifted. As previously noted, in the grease gun disclosed in U.S. Pat. No. 5,277,339, the lever must be pressed down (in a direction axial to the piston) in order to release the link from the U-shaped slot before the link can move in the slot. In other words, the grease gun in the '339 patent may not be shifted from volume mode to pressure mode with a single action by the user, but requires pressing down on the lever and then shifting of the link. As discussed, in the disclosed embodiments, the user can merely push the link 22 or slightly press down on the lever 18 and push the tabs 23 of link 22 in a single action.

The grease gun 10 works as follows. The user grips the gun 10 with his/her palm on the lever 18 and his/her fingers gripping the handle 15. When the user applies pressure, the lever 18 begins to move downward towards the handle 15. The handle 15 does not move. The force provided by the user results in a movement about the slot 36 (and the pivot 65) of the lever 18 towards the handle 15. As the lever 18 moves downward, the piston 26 moves into the piston cavity 75 of the cylinder head 28, resulting in the emission of lubricant from the grease gun 10 from an opening in the cylinder head 28, through ball valve 76.

Figure 7:
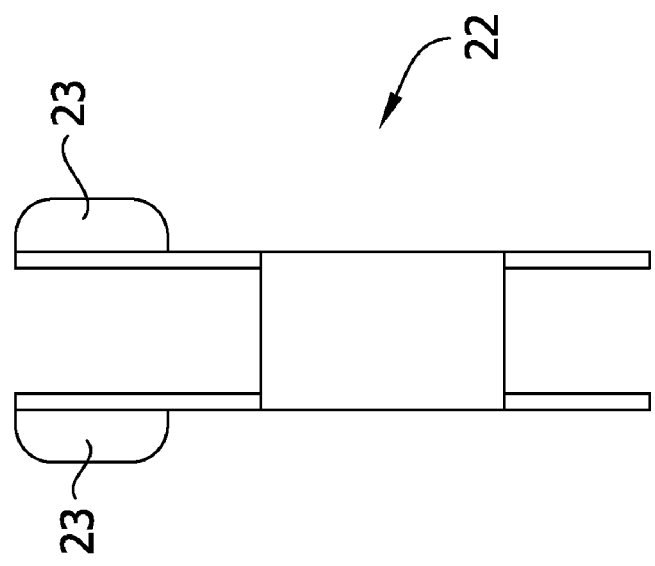
FIG. 7 is a front view of the shiftable link according to an embodiment of the invention.
Figure 6:
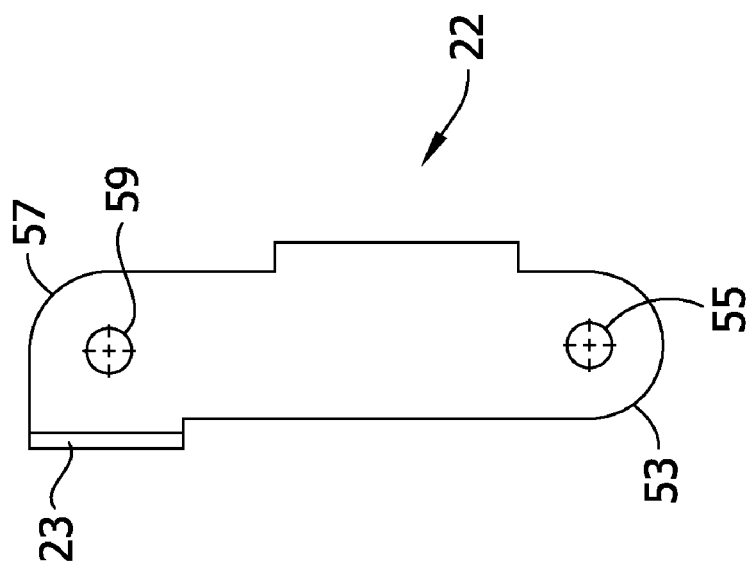
FIG. 6 is a side view of the shiftable link according to an embodiment of the invention.

Referring to FIGS. 6 and 7, the shiftable link 22 is more fully described. The shiftable link 22 has a first end 53 and a second end 57. The first end 53 of the link 22 includes a head-link connection slot 55, through which the shiftable link 22 is rotatably attached to the cylinder head 28 via rivets 63 (FIG. 1). The second end 57 of the link 22 includes a link-lever connection slot 59, through which the shiftable link 22 is rotatably attached to the lever 18 via roller 66 through slot 36. The shiftable link 22 also includes tabs 23 which provide additional surfaces for a user to push on or grasp during shifting of the link 22 between volume and pressure modes.

According to the disclosed embodiments, shifting is accomplished as a smooth motion, using a single action, wherein the link shifts alone or the lever moves downward in operation at the same time as the link is shifting. The ease of shifting of disclosed embodiments is accomplished by the specific shape of the slot 36, the roller 66 and the tabs 23 provided on the link 22. One method of shifting during use is to hold the cylinder 12 or handle 15 with one hand and to use the other hand to shift the link 22 while optionally pushing down on the front of the lever 18.

Figure 4:
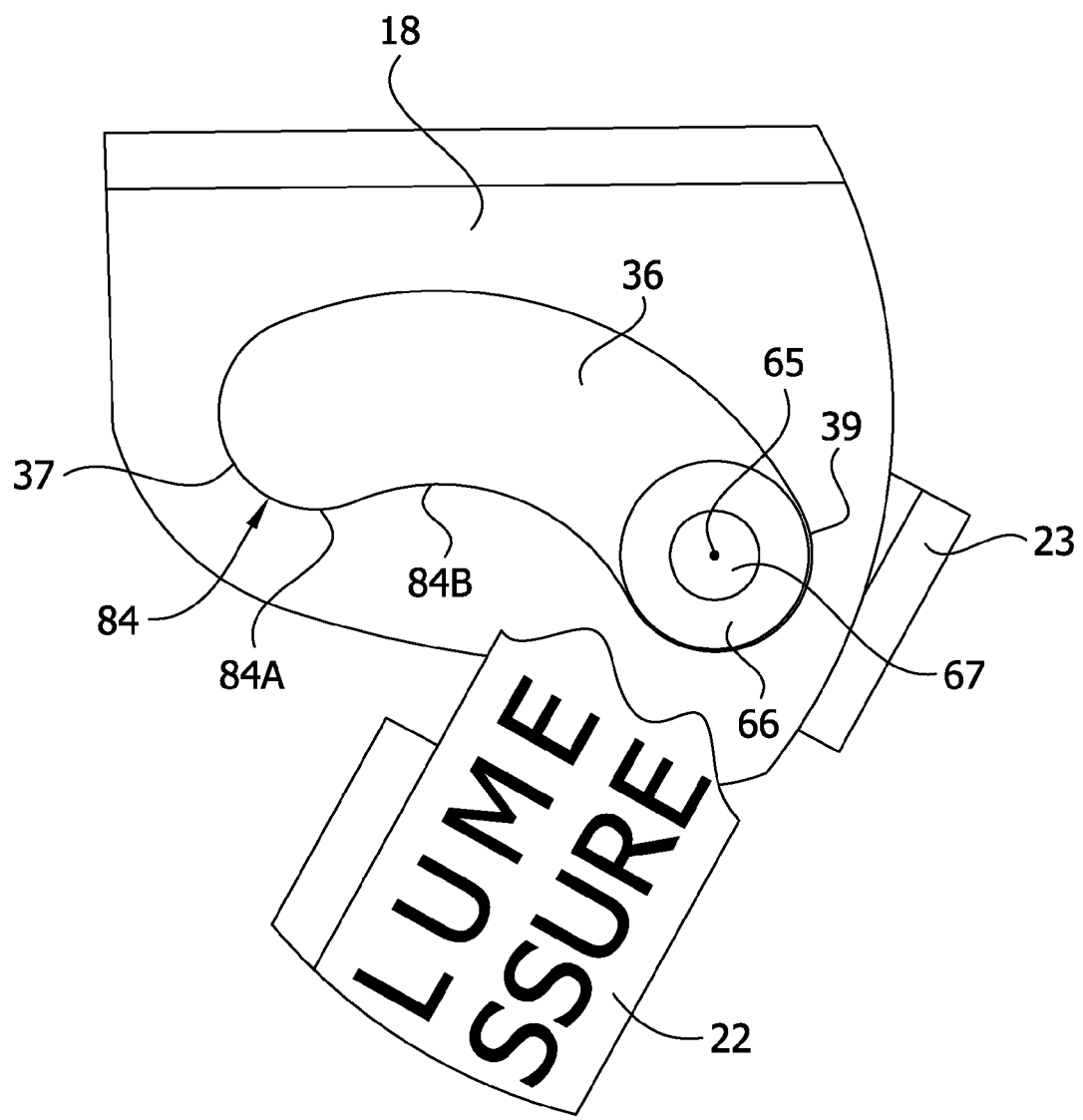
FIG. 4 is a close-up view of the portion A of the dual-mode pistol-grip grease gun of FIG. 1, wherein the dual-mode pistol-grip grease gun is switched to pressure mode.

Once again referring to FIG. 1, the difference in operation between the volume mode and pressure mode will now be discussed. When the link 22 is placed in first end portion 37 of the slot 36, the grease gun 10 will be in the volume mode. When the link 22 is in the first end position 37, the distance between the pivot 65 and the piston 26 is relatively long. When the link 22 is moved from first end portion 37 to second end portion 39 of the slot 36, the grease gun 10 will shift to the pressure mode. This position of the link 22 can be seen in FIG. 4. This position allows the grease gun 10 to operate in a pressure mode because the distance between the pivot 65 and the piston 26 shortens. This shorter distance results in a situation where for the same angular deflection of the lever 18, as compared to the volume mode, there is less travel of the piston 26. Thus, relative to the volume mode, the operator gets a greater mechanical advantage, which results in the lubricant leaving the piston cavity with greater pressure.

It is seen, therefore, that when the grease gun 10 is in the volume mode, the greatest travel of the piston 26 is possible, which results in the most lubricant being emitted from the piston cavity 75. Conversely, when the grease gun 10 is in the pressure mode, the leverage applied to the piston 26 by the lever 18 is maximized, resulting in lubricant being emitted from the piston cavity 75 with higher pressure. In the pressure mode, the volume of lubricant emitted is not critical.

While described embodiments have been described in detail, it should be readily understood that the invention is not limited to the disclosed embodiments. Rather the embodiments can be modified to incorporate any number of variations, alterations, substitutions or equivalent arrangements not heretofore described.

What is claimed as new and desired to be protected by Letters Patent of the United States is:

1. A dual-mode pistol-grip grease gun comprising:
   a cylinder head portion having a recess formed therein, the recess being adapted to receive a cylinder;
   a handle having a first end attached to the cylinder head portion, and having a free second end;
   a link having a first end and a second end, the first end of the link being rotatably connected to the cylinder head portion;
   a lever having a first end having a slot formed therein and a free second end, the second end of the link is slidably and rotatably mounted in the slot, wherein the slot has a first end portion and a second end portion each of which receive the second end of the link, wherein the second end of the link is movable between the first end portion of the slot and the second end portion of the slot, wherein positioning the second end of the link in the first end portion of the slot adapts the gun to operate in a volume mode and wherein positioning the second end of the link in the second end portion of the slot adapts the gun to operate in a pressure mode;
   a piston rotatably fastened to a central portion of the lever, the piston being in alignment with a piston cavity extending through the cylinder head portion;
   a spring surrounding the piston that biases the lever away from said handle; and
   a stop disposed in the lever central portion and engageable with a side of the piston to define a maximum withdrawal position of the piston from the piston cavity,
   wherein the slot is shaped such that, when the second end of the link is positioned in the first end portion of the slot, the link is manually adjustable, by pushing the link toward the second end portion of the slot, in a single action with or without also moving the lever;
   wherein the shape of the slot is determined based on an angle defined by a first axis and a second axis when the link is positioned in the first end portion of the slot and the lever is fully pressed toward the handle;
   wherein the first axis is defined as a line connecting a pivot point of a connection of the first end of the link to the cylinder head portion and a pivot point of a connection of the second end of the link to the first end portion of the slot;
   wherein the second axis is defined as a line connecting the pivot point of the connection of the second end of the link to the first end portion of the slot and a point along a bottom curve of the slot where the curve changes from concave to convex; and wherein the first end portion of the slot is circular thereby forming the concave portion of the curve, and the angle defined by the first axis and the second axis when the link is positioned in the first end portion of the slot and the lever is fully pressed toward the handle is between more than zero degrees and less than thirty-two degrees.

2. The dual-mode pistol-grip grease gun of claim 1, wherein the angle defined by the first axis and the second axis when the link is positioned in the first end portion of the slot and the lever is fully pressed toward the handle is between approximately five degrees and approximately twenty degrees.

3. The dual-mode pistol-grip grease gun of claim 1, wherein the angle defined by the first axis and the second axis when the link is positioned in the first end portion of the slot and the lever is fully pressed toward the handle is approximately ten degrees.

4. The dual-mode pistol-grip grease gun of claim 1, wherein the slot is shaped such that the bottom curve of the slot is a gradual curve.

5. The dual-mode pistol-grip grease gun of claim 1, wherein the link further includes tabs located near the second end of the link.

6. The dual-mode pistol-grip grease gun of claim 1, wherein the first end of the link is rotatably connected to the cylinder head portion by a rivet.

7. The dual-mode pistol-grip grease gun of claim 1, wherein the piston is rotatably fastened to the central portion of the lever by a rivet.

8. The dual-mode pistol-grip grease gun of claim 1, wherein the second end of the link is slidably and rotatably mounted in the slot by a roller.

9. The dual-mode pistol-grip grease gun of claim 1, wherein the slot is further shaped such that, when the second end of the link is positioned in the first end portion of the slot, the link is manually adjustable, by pressing down on the lever and pushing the link toward the second end portion of the slot, in the single action.

10. The dual-mode pistol-grip grease gun of claim 1, wherein the slot is further shaped such that, when the second end of the link is positioned in the second end portion of the slot the link is manually adjustable by pushing the link toward the first end portion of the slot, in a single action without also moving the lever.

11. A method of manufacturing a dual-mode grease gun, the method comprising:
forming a cylinder head portion having a recess formed therein, the recess being adapted to receive a cylinder;
forming a handle having a first end attached to the cylinder head portion, and having a free second end;
forming a link having a first end and a second end and rotatably connecting a first end of the link to the cylinder head portion;
forming a lever including a slot in a first end;
slidably and rotatably mounting the second end of the link in the slot, wherein the slot has a first end portion and a second end portion adapted to receive the second end of the link, wherein the second end of the link is movable between the first end portion of the slot and the second end portion of the slot, wherein positioning the second end of the link in the slot first portion adapts the gun to operate in a volume mode and wherein positioning the second end of the link in the slot second portion adapts the gun to operate in a pressure mode;

forming a piston rotatably fastened to a central portion of the lever, the piston being in alignment with a piston cavity extending through the cylinder head portion;
forming a spring surrounding the piston that biases the lever away from said handle; and
forming a stop disposed in the lever central portion and engageable with a side of the piston to define a maximum withdrawal position of the piston from the piston cavity,
wherein forming the slot includes determining a shape of the slot such that when the second end of the link is positioned in the first end portion of the slot, the link is manually adjustable, by pushing the link toward the second end portion of the slot, in a single action with or without also moving the lever;
wherein determining the shape of the slot includes determining the value of an angle defined by a first axis and a second axis when the link is positioned in the first end portion of the slot and the lever is fully pressed toward the handle;
wherein the first axis is defined as a line connecting a pivot point of a connection of the first end of the link to the cylinder head portion and a pivot point of a connection of the second end of the link to the first end portion of the slot;
wherein the second axis is defined as a line connecting the pivot point of the connection of the second end of the link to the first end portion of the slot and a point along a bottom curve of the slot where the concavity of the curve changes from concave to convex; and
wherein the first end portion of the slot is circular thereby forming the concave portion of the curve, and the angle defined by the first axis and the second axis when the link is positioned in the first end portion of the slot and the lever is fully pressed toward the handle is between more than zero degrees and less than thirty-two degrees.

12. The method of claim 11, wherein the angle defined by the first axis and the second axis when the link is positioned in the first end portion of the slot and the lever is fully pressed toward the handle is between approximately five degrees and approximately twenty degrees.

13. The method of claim 11, wherein the angle defined by the first axis and the second axis when the link is positioned in the first end portion of the slot and the lever is fully pressed toward the handle is approximately ten degrees.

14. The method of claim 11, wherein the slot is shaped such that a bottom curve of the slot is a gradual curve.

15. The method of claim 11, wherein forming the slot further includes determining the shape of the slot such that when the second end of the link is positioned in the first end portion of the slot, the link is manually adjustable, by pressing down on the lever and pushing the link toward the second end portion of the slot, in the single action.

16. The method of claim 11, wherein forming the link further includes forming tabs located near the second end of the link.

17. A dual-mode pistol-grip grease gun comprising:
a cylinder head portion having a recess formed therein, the recess being adapted to receive a cylinder;
a handle having a first end attached to the cylinder head portion, and having a free second end;
a link having a first end and a second end, the first end of the link being rotatably connected to the cylinder head portion;
a lever having a first end having a slot formed therein and a free second end, the second end of the link is slidably and rotatably mounted in the slot, wherein the slot has a first end portion and a second end portion each of which receive the second end of the link, wherein the second end of the link is movable between the first end portion of the slot and the second end portion of the slot, wherein positioning the second end of the link in the first end portion of the slot adapts the gun to operate in a volume mode and wherein positioning the second end of the link in the second end portion of the slot adapts the gun to operate in a pressure mode;

a piston rotatably fastened to a central portion of the lever, the piston being in alignment with a piston cavity extending through the cylinder head portion;

a spring surrounding the piston that biases the lever away from said handle; and a stop disposed in the lever central portion and engageable with a side of the piston to define a maximum withdrawal position of the piston from the piston cavity, wherein the slot is shaped to have a bottom curve comprising a concave arc partially defining the first end portion of the slot for receiving the second end of the link, and a convex arc connected to the concave arc such that, when the second end of the link is positioned in the first end portion of the slot, the link is manually adjustable, by pushing the link toward the second end portion of the slot, in a single action during which the second end of the link travels from the first end portion of the slot up along the convex arc of the bottom curve toward the second end portion of the slot.

* * * * *